(12) United States Patent
de Jongh et al.

(10) Patent No.: US 12,468,511 B2
(45) Date of Patent: Nov. 11, 2025

(54) INTEGRATING CODE REPOSITORIES

(71) Applicants: Atlassian Pty Ltd., Sydney (AU); Atlassian Inc., San Francisco, CA (US)

(72) Inventors: Marco de Jongh, Sydney (AU); Luke James Batchelor, Sydney (AU); Michael Joseph Blaszczyk, Sydney (AU)

(73) Assignees: ATLASSIAN PTY LTD., Sydney (AU); ATLASSIAN US, INC., San Francisco, CA (US)

( * ) Notice: Subject to any disclaimer, the term of this patent is extended or adjusted under 35 U.S.C. 154(b) by 0 days.

(21) Appl. No.: 17/149,679

(22) Filed: Jan. 14, 2021

(65) Prior Publication Data
US 2022/0222050 A1   Jul. 14, 2022

(51) Int. Cl.
*G06F 8/36* (2018.01)
*G06F 8/61* (2018.01)

(52) U.S. Cl.
CPC .................. *G06F 8/36* (2013.01); *G06F 8/61* (2013.01)

(58) Field of Classification Search
CPC ...................................... G06F 8/36; G06F 8/61
See application file for complete search history.

(56) References Cited

U.S. PATENT DOCUMENTS

| | | | |
|---|---|---|---|
| 9,430,229 B1 * | 8/2016 | Van Zijst | G06F 9/3844 |
| 10,515,005 B1 * | 12/2019 | Burrell | G06F 11/368 |
| 10,979,440 B1 * | 4/2021 | Kalika | H04L 9/3247 |
| 11,093,227 B1 * | 8/2021 | Shteyman | H04L 67/34 |
| 2013/0174122 A1 * | 7/2013 | Watters | G06F 8/36 717/121 |
| 2015/0286558 A1 * | 10/2015 | Bartlow | G06F 8/71 717/131 |
| 2016/0162263 A1 * | 6/2016 | Brunswig | G06F 8/71 717/101 |
| 2018/0060065 A1 * | 3/2018 | Lai | G06F 8/71 |
| 2018/0121293 A1 * | 5/2018 | Phillips | G06F 11/1451 |
| 2018/0373502 A1 * | 12/2018 | Ganninger | G06F 8/34 |
| 2019/0196805 A1 * | 6/2019 | Lee | G06F 21/6209 |
| 2019/0317754 A1 * | 10/2019 | Mosquera | H04L 51/02 |
| 2020/0081814 A1 * | 3/2020 | Srinivasan | G06F 8/71 |

(Continued)

OTHER PUBLICATIONS

Alderman, Daniel A. "Workflow Repository Integration with the P-GRADE Portal." Worcester Polytechnic Institute. (2009). (Year: 2009).*

(Continued)

*Primary Examiner* — Bradley A Teets
*Assistant Examiner* — Joanne G Macasiano
(74) *Attorney, Agent, or Firm* — Brownstein Hyatt Farber Schreck, LLP

(57) ABSTRACT

Described herein is a computer implemented method and a computer system for processing a modification to a first repository, the first repository including components that are used in a second repository. The method comprises executing an integrator service that is communicatively coupled to the first repository and to the second repository; the integrator service detecting the modification to the first repository; the integrator service causing generation of an integrated repository by integration of the detected modification into the second repository; and the integrator service triggering processing of the integrated repository.

18 Claims, 5 Drawing Sheets

(56) References Cited

U.S. PATENT DOCUMENTS

2021/0173627 A1* 6/2021 Ranjan .................... G06F 9/451
2021/0182054 A1* 6/2021 Kalika ................ G06F 11/3692
2021/0349736 A1* 11/2021 Callery ............... G06F 9/44505

OTHER PUBLICATIONS

Elsen, Rickard, Inggriani Liem, and Saiful Akbar. "Software versioning quality parameters: Automated assessment tools based on the parameters." 2016 International Conference on Data and Software Engineering (ICoDSE). IEEE, 2016. (Year: 2016).*
Mitchell, Dustin J., and Tom Prince. "Automating Build, Test, and Release with Buildbot." 2013 (Year: 2013).*
Mulvenna, Maurice, et al. "Service Delivery Platforms: Servicing Real-World Mobile Ubiquitous Computing Applications." (2004). (Year: 2004).*
Klatt, Benjamin, et al. "Identify impacts of evolving third party components on long-living software systems." 2012 16th European Conference on Software Maintenance and Reengineering. IEEE, 2012. (Year: 2012).*
Gómez, Verónica Uquillas, Stéphane Ducasse, and Andy Kellens. "Supporting streams of changes during branch integration." Science of Computer Programming 96 (2014): 84-106. (Year: 2014).*
Brun, Yuriy, et al. "Early detection of collaboration conflicts and risks." IEEE Transactions on Software Engineering 39.10 (2013): 1358-1375. (Year: 2013).*

* cited by examiner

INTEGRATING CODE REPOSITORIES

TECHNICAL FIELD

Aspects of the present disclosure are directed to code repositories. In particular, the present disclosure is directed to methods, systems and software products for integrating separate code repositories such that they behave as a single repository.

BACKGROUND

Software developed in the JavaScript® language is often distributed as a "package" that is available for download from a package registry such as the "npm registry". Developers can download packages from the package registry to use in developing their own software product. For example, a package may provide a user interface element that developers use to create client-side JavaScript applications. In this regard, Applicant's "Atlaskit" is a collection of reusable packages that developers use to build the front-end of Applicant's Jira® or Confluence® products (amongst others). Other packages may provide components such as web servers or application servers that developers use to create server-side JavaScript applications.

Source code for a particular package resides in a separate repository (hereinafter a "package repository") to the repository for a product (hereinafter a "product repository") that uses (or "consumes") the components that the package provides. However, this distributed repository structure imposes certain limitations on software developers. For example, when a component's source code is modified, testing of the modifications is limited to the component itself or, at most, the package that provides the component. In other words, there is currently no reliable way to test what impact modifying a component's source code will have on a product that consumes the modified component. Systems and techniques described herein may be used to facilitate the use of different repositories to solve problems that exist in some current implementations.

Background information described in this specification is background information known to the inventors. Reference to this information as background information is not an acknowledgment or suggestion that this background information is prior art or is common general knowledge to a person of ordinary skill in the art.

SUMMARY

Described herein are methods, systems and software products for integrating separate code repositories such that they behave as a single repository.

In this way, package developers have the benefit of software-tool configurations that act on the product repositories that consume the developer's packages. In turn, the present disclosure allows package developers to quality-assure their code through testing in an actual product.

Figure 1:
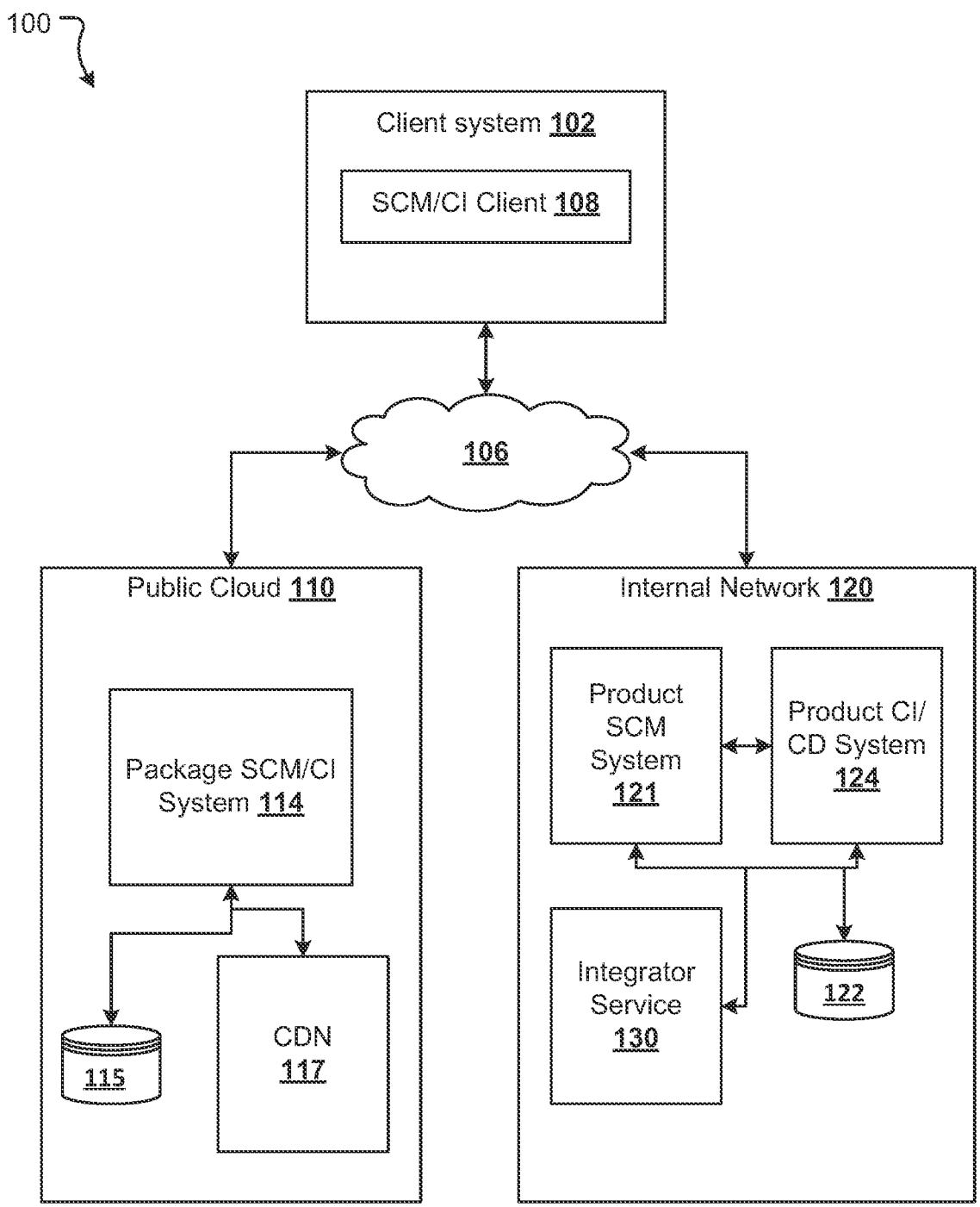
FIG. 1 is a diagram depicting a networked environment in which various features of the present disclosure may be implemented.

While the description is amenable to various modifications and alternative forms, specific embodiments are shown by way of example in the drawings and are described in detail. It should be understood, however, that the drawings and detailed description are not intended to limit the invention to the particular form disclosed. The intention is to cover all modifications, equivalents, and alternatives falling within the scope of the present invention as defined by the appended claims.

DETAILED DESCRIPTION

In the following description numerous specific details are set forth in order to provide a thorough understanding of the present invention. It will be apparent, however, that the present invention may be practiced without these specific details. In some instances, well-known structures and devices are shown in block diagram form in order to avoid unnecessary obscuring.

As described above, software developed in the JavaScript® language is often distributed as a "package" that is available for download from a package registry such as the "npm registry". Developers can download packages from the package registry to use in developing their own software product. For example, a package may provide a user interface element that developers use to create client-side JavaScript applications. In this regard, Applicant's "Atlaskit" is a collection of reusable packages that developers use to build the front-end of Applicant's Jira® or Confluence® products (amongst others). Other packages may provide components such as web servers or application servers that developers use to create server-side JavaScript applications.

The source code for a package is written and maintained in a source code repository, that is typically under some form of version control. To make the package publicly available, the developer builds the package's source code (i.e., in the source code repository) into a suitable build artefact, and uploads the build artefact to the package registry. Software tools known as "package managers" automate the process of downloading packages from the package registry and installing them in the local directory hierarchy. There are a variety of package managers that can interface with the npm registry, including npm (or "node package manager"), yarn, ied, pnpm, and npmd. Package managers typically provide a client-side command line interface (CLI) and in-built commands that the developer uses to perform package-related operations.

The source code for a particular package resides in a separate repository (hereinafter a "package repository") to the repository for a product (hereinafter a "product repository") that uses (or "consumes") the components that the package provides. However, this distributed repository structure imposes certain limitations on software developers. For example, when a component's source code is modified, testing of the modifications is limited to the component itself or, at most, the package that provides the component. In other words, there is currently no reliable way to test what impact modifying a component's source code will have on a product that consumes the modified component.

In addition, the distributed repository structure means that software-tool configurations used in a product repository are not available to the package repository. For example, the product repository may use specially-configured tools such as "continuous integration" and/or "continuous delivery" systems, whose configurations are not necessarily available to the package repository. The systems and techniques described herein may be used to facilitate use of different repositories in order to provide more robust and reliable systems.

FIG. 1 depicts one example of a networked environment 100 in which the various operations and techniques described herein can be performed.

Networked environment 100 includes a client system 102 which communicates with remote network hosts via the Internet 106.

Client system 102 hosts an SCM/CI client application 108 which, when executed by the client system 102, configures the SCM/CI client application 108 to provide client-side functionality. SCM/CI client application 108 is a source code management (SCM) system with integrated continuous integration (CI) functionality.

Those skilled in the art will appreciate that CI is a software development practice that requires software developers to periodically integrate source code into a shared repository where builds and tests then run. Automated tools are used to assert the new code's correctness before integration. The shared repository is usually managed by an SCM system (also called a revision control or version control system) that tracks and manages source code as it is written and revised. The revisions (also called "commits" in Git) added to the SCM system can be automatically deployed by a CI management system into one or more environments. The SCM system is also often supplemented with other checks such as automated code quality tests and syntax style review tools.

One example of an SCM/CI client application 108 in which features of the present disclosure may be implemented is "Bitbucket Cloud", which is commercially available from Applicant. Bitbucket Cloud is a web-based SCM system hosted on public cloud infrastructure. CI functionality (known as "Bitbucket Pipelines") is integrated within Bitbucket Cloud. It will be appreciated that the various features and techniques described herein could, with appropriate modifications, be used with alternative SCM systems and CI management systems, either as separate or integrated systems.

SCM/CI client application 108 typically executes within a general web browser application (such as Chrome, Safari, Internet Explorer, Opera, or an alternative web browser application) which accesses server-side applications executing on a Public Cloud 110 via an appropriate uniform resource locator (URL). SCM/CI client application 108 communicates with server-side applications via general world-wide-web protocols (e.g. http, https, ftp). Alternatively, SCM/CI client application 108 may be a specific application programmed to communicate with server-side applications using defined application programming interface (API) calls.

A given SCM/CI client application 108 may have more than one client application, for example both a general web browser application and a dedicated programmatic client application.

A Package SCM/CI System 114 executes on Public Cloud 110 to provide server-side functionality to the SCM/CI client application 108. Package SCM/CI System 114 comprises one or more application programs, libraries, APIs or other software elements that implement the features and functions that are described herein. For example, where the SCM/CI client application 108 executes in a web browser, the Package SCM/CI System 114 includes a web server such as Apache, IIS, nginx, GWS, to manage communications with the browser. Where the client application SCM/CI client application 108 is a specific application, the Package SCM/CI System 114 includes an application server configured specifically to interact with the SCM/CI Client application 108.

The Package SCM/CI System 114 also includes one or more application programs, libraries, APIs or other software elements to provide version-controlled repository hosting and CI functionality to SCM/CI client application 108. In this regard, the Package SCM/CI System 114 allows client applications (such as the SCM/CI client application 108) to create new repositories and make contributions to the source code in existing repositories. Those skilled in the art will appreciate that contributions to source code repositories are made through issuing Git commands to the Package SCM/CI System 114 via the SCM/CI client application. For example, the user of Client system 102 can issue suitable Git commands to push commits, create braches and generate pull requests. The Package SCM/CI System 114 likewise provides CI functionality to SCM/CI client application 108, such as by allowing users to set development triggers (such as builds, testing and deployment) to run automatically in response to changes being made to the repository.

In the present example, the Package SCM/CI System 114 stores a Package Repository 115 (namely a repository containing source code for a package that products can consume) in a database.

The Package SCM/CI System 114 also accesses a Content Delivery Network (CDN) 117 in order to publicly distribute build artefacts built from Package Repository 115, such as by way of the npm registry. A suitably-configured artefactory package registry can be used in place of CDN 117.

Although Package SCM/CI System 114 and Package Repository 115 are illustrated as being housed in Public Cloud 110, those skilled in the art will appreciate that with suitable modifications, they could be implemented in on-premises servers or datacentres.

Environment 100 includes an Internal Network 120. In the exemplified embodiment, the Internal Network 120 is under the control of an entity that develops and distributes software products. To this end, Internal Network includes a Product SCM System 121 that the Entity's developers use to develop, upgrade and maintain software products. As discussed above, the developed software products utilise functionality that is provided by packages.

The source code for software products is developed and maintained in a version-controlled Product Repository 122 that is stored in a database. In the exemplified embodiment, the Product SCM System 121 is Applicant's "Bitbucket Server" or "Bitbucket Data Center" product, however those skilled in the art will appreciate that other SCM systems could be used with appropriate modifications.

To further assist software development, a Product CI/CD System 124 is installed on Internal Network 120. Product CI/CD System 124 provides CI and CD functionality such as triggered builds, automated testing, scheduled delivery and the like. Product CI/CD System 124 is connected to the Product SCM System 121 to provide access to the Product Repository 122 that the Product SCM System 121 manages. In the exemplified embodiment, the Product CI/CD System 124 is Applicant's "Bamboo" product, however those skilled in the art will appreciate that other CI/CD systems could be used with appropriate modifications.

An Integrator Service 130 is installed on Internal Network 130. As described in further detail below, Integrator Service 130 is responsible, amongst other functionality, for gathering and communicating CI/CD status information from the Product CI/CD System 124 to the Package SCM/CI System 114. Although illustrated as a separate module, Integrator Service 130 could execute as a service within, for example, Product CI/CD System 124.

Because the Product CI/CD System 124 resides on a private network (namely Internal Network 120), it cannot be triggered (such as by a post message or a web-hook) from the Package SCM/CI System 114 (residing on Public Cloud 110) to perform CI/CD routines.

The various applications and data storage units respectively installed on Public Cloud 110 and Internal Network 120 communicate data between each other either directly or indirectly through one or more communications networks. These communication networks may comprise one or more local area networks, a public network, or a combination of networks.

While the various applications and data storage units respectively installed on Public Cloud 110 and Internal Network 120 are depicted and described as executing on single server machines, alternative architectures are possible. For example, in certain cases a clustered server architecture may be used where multiple server computing instances (or nodes) are instantiated on one or more computer processing systems to meet system demand. Conversely, in the case of small enterprises with relatively simple requirements the Internal Network 120 may be a stand-alone implementation (i.e. a single computer directly accessed/used by end users).

Client system 102 may be any computer processing system which is configured (or configurable) by hardware and/or software to offer client-side functionality. Similarly, the machines that comprise the Public Cloud 110 and Internal Network 120 may be any computer processing system which is configured (or configurable) by hardware and/or software to provide server-side functionality. By way of example, suitable client and/or server systems may include: server computer systems, desktop computers, laptop computers, netbook computers, tablet computing devices, mobile/smart phones, personal digital assistants, personal media players, set-top boxes, games consoles.

The present disclosure will be exemplified by reference to Atlaskit components. However, those skilled in the art will appreciate that the teachings of the present disclosure can, with suitable modification, be applied to any kind of reusable software component, such as those provided as node packages.

The present disclosure may contribute to accelerated package adoption, by allowing the Product CI/CD System 124 to perform CI/CD routines on modifications made to packages and components that the product consumes. For example, a user of SCM/CI Client 108 may create a new branch in the Package Repository 115 in order to modify or provide new functionality to one of the package's components. To this end, the developer authors the source code for the branch and issues a pull request (PR) to the Package SCM/CI System 114 in respect of the new branch. The present disclosure allows the Product CI/CD System 124 to perform CI/CD routines on the new branch, as if it was created in Product Repository 122. In this way, package developers are able to validate how their changes will function when the package is consumed in a product.

For example, the Product CI/CD System 124 may build an artefact from Product Repository 122 that incorporates the modified package and deploy the artefact to a test or production environment. This incentivises both product developers and package developers to invest in test layers covering package changes.

This approach of the present disclosure may also allow errors in packages (including "breaking changes" from version bumps) to be more readily identified and fixed. In this regard, instead of breaking when a product consumes a finalised package (such as by downloading the finalised package from a package registry), product tests will break when the product first consumes a development version of the modified package. This results in failures that are easier to comprehend and fix.

The present disclosure is particularly suited to products that are publicly released according to a structured release schedule. However, those skilled in the art will realise that the techniques of the present disclosure are applicable to a wide range of products.

Figure 2:
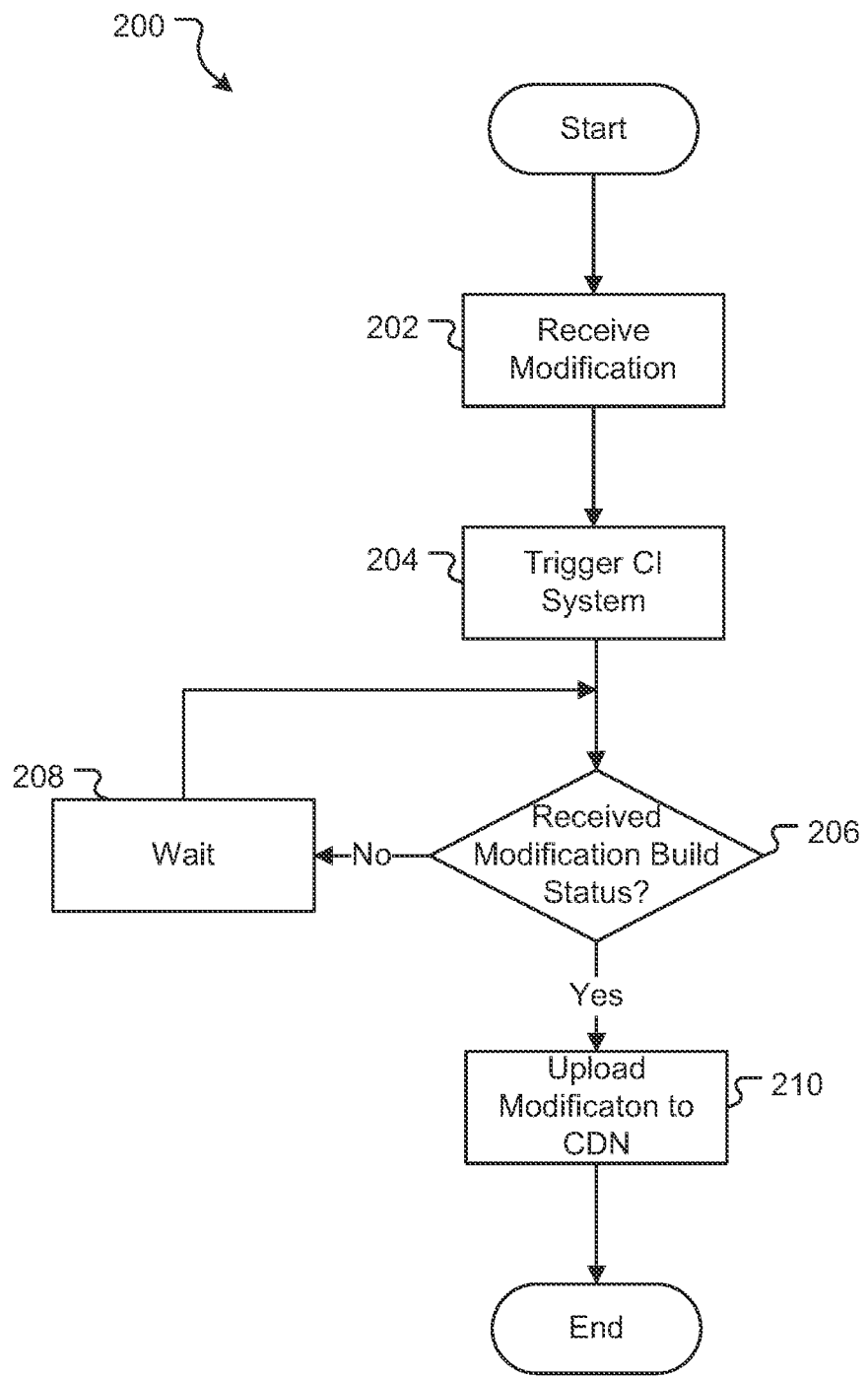
FIG. 2 is a flow-chart depicting processing performed by a package source-code management system to implement various features of the present disclosure.

Exemplary processing 200 performed by the Package SCM/CI System 114 to implement various features of the present disclosure will be described by reference to the flowchart of FIG. 2.

The process commences at step 200 at which the Package SCM/CI System 114 receives from SCM/CI Client 108, a modification to the Package Repository 115. In the exemplified embodiment, the modification relates to the user of SCM/CI Client 108 creating a new branch in the Package Repository 115 and issuing a PR in respect of the new branch. However, the present disclosure can readily be applied to other types of modifications to repositories.

As described above, Package SCM/CI System 114 has a built-in CI tool that allows software to be built, tested and deployed from directly within the Package SCM/CI System 114. In this regard, at step 204, the built-in CI tool is triggered by the receipt of the PR, and performs its CI routines in response thereto. Typically, these routines come as base-level functionality with the SCM/CI Client 108, or are specifically programmed by the user of the SCM/CI Client 108. For example, the user may have programmed the SCM/CI System 114, on receipt of a new branch, to automatically build and test the branch by reference to a supplied test script.

After performing the programmed CI routines, the Package SCM/CI System 114 performs a determination (step 206) of whether it has received modification-processing status information from the Integrator Service 130. As discussed below, modification-processing status information comprises information about the status of processing performed on the modification by the Product CI/CD System 124. For example, modification-processing status information may include information about whether the Product CI/CD System 124 successfully built a product from the Product Repository 122, or about whether the product that incorporates the modified component encapsulated in the new branch, passed automated testing.

The process waits for a predetermined time period (step 208) in the event that the Package SCM/CI system 114 has not received modification-processing status information from the Integrator Service 130, before returning to step 206.

In the event that the Package SCM/CI System 114 has received modification-processing status information from the Integrator Service 130, the Package SCM/CI System 114, builds an artefact from the Package Repository 115 and uploads the artefact to the CDN 117 for distribution (step 210). Those skilled in the art will appreciate that build artefacts (including those related to new branches and PRs) are usually distributed to a CDN or registry as an archive file (or "tarball") with an accompanying manifest.json file.

Figure 3:
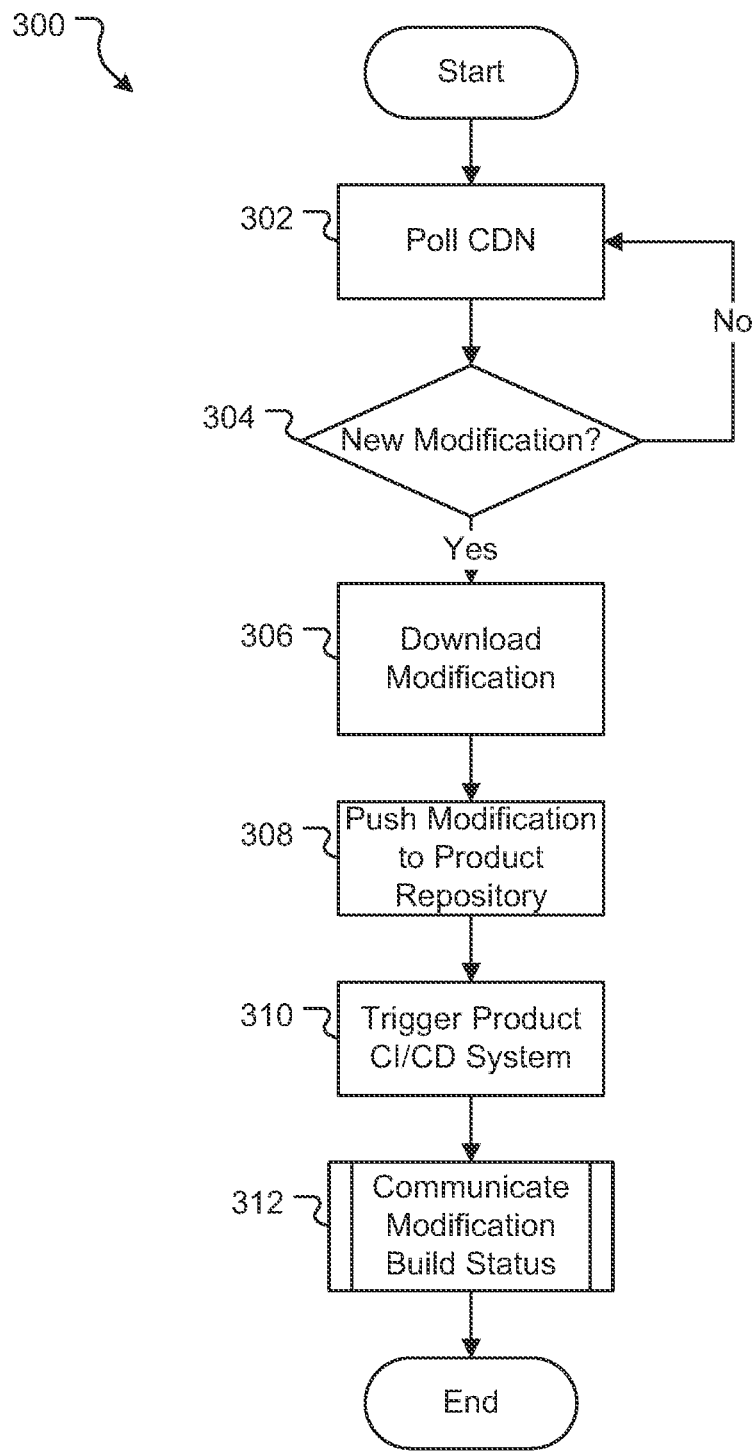
FIG. 3 is a flow-chart depicting processing performed on a product repository to implement various features of the present disclosure.

Exemplary processing 200 performed by the applications installed on Internal Network 120 to implement various features of the present disclosure will be described by reference to the flowchart of FIG. 3.

The process 300 commences at step 302, at which the Integrator Service 130 periodically polls the CDN 117 to determine whether modifications have been made to the Package Repository 115. The Integrator Service 130 determines whether modifications have been made (step 304) and returns to polling if there are no modifications.

In the event that the Integrator Service 130 detects that the Package Repository 115 has been modified, the Integrator Service 130 downloads the modification (step 306) to the Internal Network 120. For example, the modification may comprise a new repository branch that encapsulates new or modified features for a package or component. According to some embodiments, the branch is a "development branch" with its own deployment path that is independent of the deployment path of the Package Repository's 115 main branch. Such a branch is hereinafter referred to as a "Branch-Deploy Object".

In this scenario, the Integrator Service 130 downloads the Branch-Deploy Object to the Internal Network 120. The Branch-Deploy Object (in common with other modifications) includes a commit hash that the Package SCM/CI System 114 generated when the Branch-Deploy-Object was committed to Package Repository 115. The Integrator Service 130 also downloads the manifest.json file that was generated when an artefact built from Package Repository 115 was uploaded to the CDN 117.

Using the information in the commit hash and manifest.json file, the Integrator Service 130 can readily determine exactly packages or components in Package Repository 115 have branches with their own deployment paths independent of the main branch's deployment path.

At step 308, the Integrator Service 130 pushes the Branch-Deploy Object to the Product SCM System 121. The Product SCM System 121 (using the downloaded manifest.json file) upgrades the Product Repository 122 to incorporate the versions of the packages or components that are Branch-Deploy Objects. The Product SCM System 121 creates one or more branches in Product Repository 122 for this purpose, and loads the Branch-Deploy Object into the created branch.

The Product SCM System 121 names the newly-created branch with a prefix to indicate the Integrator Service's 130 ownership of the branch. The Product SCM System 121 also uses the same name for the branch as is used in Package Repository 115. This information is included in the Branch-Deploy Object.

For example, in the case of Atlaskit, a branch in Product Repository 122 named "atlaskit-branch-deploy-develop", utilises the prefix "atlaskit-branch-deploy" to signify Integrator Service 130 ownership. In Package Repository 115, the branch is named "develop".

If the branch name already exists due to a previous processing iteration, the Branch-Deploy Objects is loaded into the existing branch.

At step 310, modifications made to the Product Repository 122 trigger the Product CI/CD System 124 to perform its programmed CI/CD routines. For example, the Product CI/CD System 124 may build an artefact from the Product Repository 122 and run automated testing on the artefact. This artefact is the product that incorporates packages or components with modified or improved functionality (as encapsulated in the Branch-Deploy Object). The Product CI/CD System 124 can also upgrade the packages or components in the product to the "branch-deployed" versions using the "yarn upgrade" or "bolt upgrade" command.

In this way, the Product CI/CD System 124 performs CI/CD routines on a product that includes modified packages or components; those modifications being independently made through the Package Repository 115.

At step 312, the Integrator Service 130 gathers the modification-processing status information that the Product CI/CD System 124 generates when performing CI/CD routines on the Branch-Deploy Object, and communicates the modification-processing status information to the Package SCM/CI System 114. Communication to Package SCM/CI System 114 is typically by way of the Package SCM/CI System's 114 REST API. As noted above, the Package SCM/CI System 114 can utilise the modification-processing status information to control the uploading of build artefacts to the CDN 117. The modification-processing status information is also valuable for package developers to debug and improve their code.

Preferably, the CI pipelines respectively implemented by the Product CI/CD System 124 and Package SCM/CI System 114 are not linked. This pipeline decoupling can be achieved by communicating a "stopped" status to the Package SCM/CI System 114 in the event of a failed build of a product that incorporates a Branch-Deploy Object. A "stopped" status has the advantage of passing merge checks that the Package SCM/CI System 114 applies, while at the same time indicating a non-green default status in respect of the branch/PR.

In an alternative embodiment, the Package SCM/CI System 114 and Package Repository 115 are implemented on Internal Network 120. According to this embodiment, Integrator Service 130 can be configured to monitor modifications to the Package Repository 115 and cause the Product SCM System 121 to update the Product Repository 122 with the modifications. This in turn triggers the Product CI/CD System 124 to perform CI/CD routines on the Product Repository 122.

The process for gathering and communicating modification-processing status information performed at step 312 above is described and illustrated with reference to FIG. 4.

Figure 4:
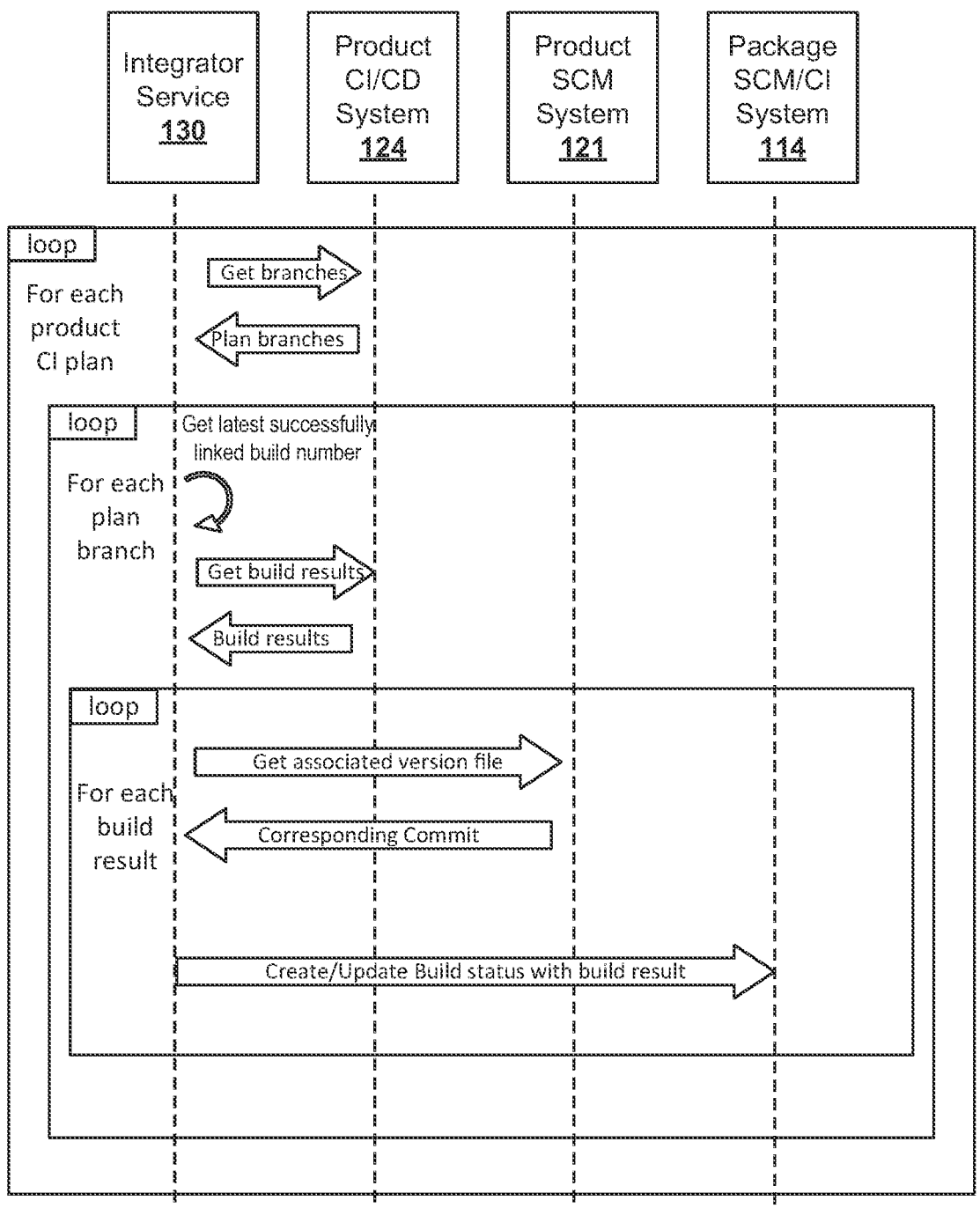
FIG. 4 is a flow-chart depicting processing performed to communicate product build status information from a product repository to a package repository.

As illustrated in FIG. 4, gathering and communicating modification-processing status information involves communication between the Integrator Service 130, Product CI/CD System 124, Product SCM System 121 and Package SCM/CI System 114.

Preferably, modification-processing status information is communicated to Package SCM/CI System 114 relatively soon after the Product CI/CD System 124 performs CI/CD routines on a product that contains the Branch-Deploy Object. In this regard, the Integrator Service 130 is responsible for gathering and communicating modification-processing status information, rather than scheduling the Product CI/CD System 124 to perform the function. To this end, Integrator Service 130 performs a cronjob at a suitable interval (such as every 5 minutes) involving retrieving the product CI plans generated by the Product CI/CD System 124. Product CI plans are retrieved from the Product CI/CD System 124 using a REST API.

For each retrieved Product CI plan, the Integrator Service 130 retrieves all of the relevant category of modification. For example, for a Branch-Deploy Object, Integrator Service 130 retrieves all of the branches comprised in the CI plan from the Product CI/CD System 124. For each of these branches, the Integrator Service 130 extracts the latest successfully-linked build number and retrieves, from Product CI/CD System 124, the build results for the branch after the last linked build.

For each build result retrieved from the Product CI/CD System 124, the Integrator Service 130 retrieves, from the Product SCM System 121, a JSON file containing information about an association between the commit of the Branch-Deploy-Object to the Package Repository 115, and the commit of the Branch-Deploy-Object to the Product Repository 122.

The build result of this package commit is then communicated by the Integrator Service 130 to the Package SCM/CI System 114 as modification-processing status information.

Various embodiments and features of the present disclosure are implemented using one or more computer processing systems.

Figure 5:
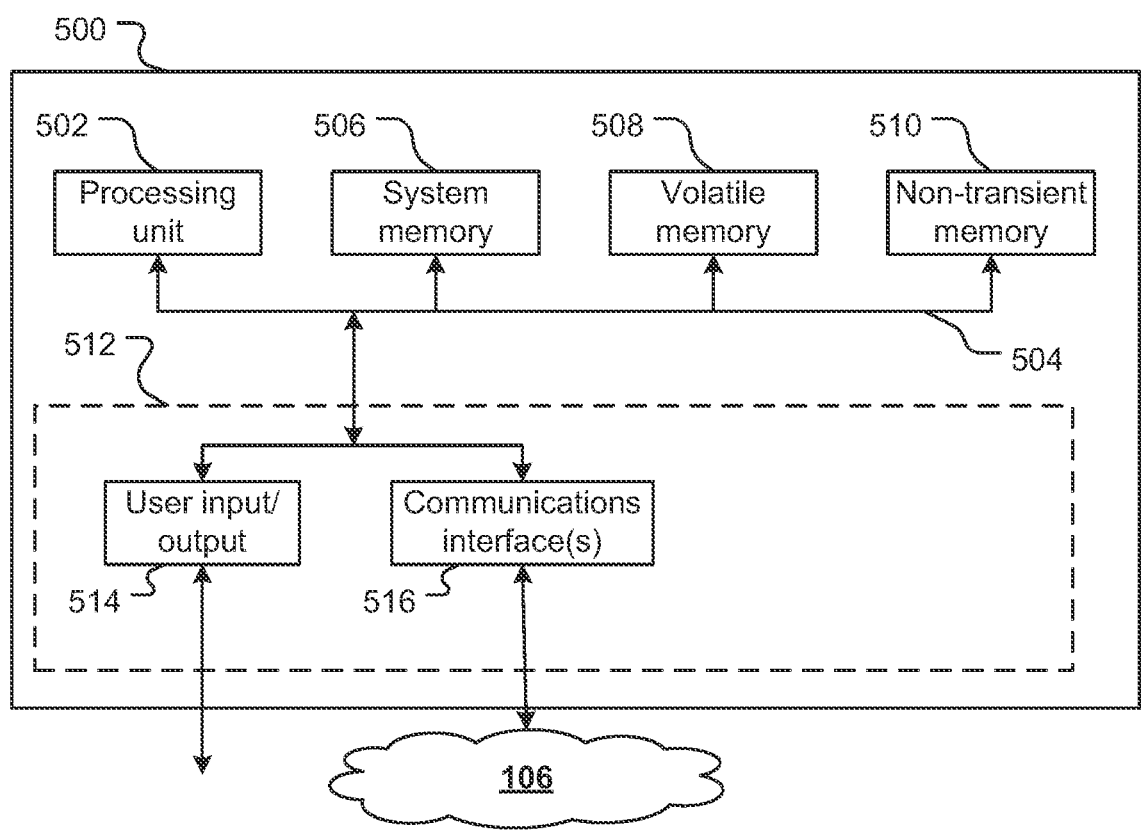
FIG. 5 is a block diagram of a computer processing system configurable to perform various features of the present disclosure.

FIG. 5 provides a block diagram of a computer processing system 500 configurable to implement embodiments and/or features described herein. System 500 is a general purpose computer processing system. It will be appreciated that FIG. 5 does not illustrate all functional or physical components of a computer processing system. For example, no power supply or power supply interface has been depicted, however system 500 will either carry a power supply or be configured for connection to a power supply (or both). It will also be appreciated that the particular type of computer processing system will determine the appropriate hardware and architecture, and alternative computer processing systems suitable for implementing features of the present disclosure may have additional, alternative, or fewer components than those depicted.

Computer processing system 500 includes at least one processing unit 502—for example a general or central processing unit, a graphics processing unit, or an alternative computational device). Computer processing system 500 may include a plurality of computer processing units. In some instances, where a computer processing system 500 is described as performing an operation or function all processing required to perform that operation or function will be performed by processing unit 502. In other instances, processing required to perform that operation or function may also be performed by remote processing devices accessible to and useable by (either in a shared or dedicated manner) system 500.

Through a communications bus 504, processing unit 502 is in data communication with a one or more computer readable storage devices which store instructions and/or data for controlling operation of the processing system 500. In this example system 500 includes a system memory 506 (e.g. a BIOS), volatile memory 508 (e.g. random access memory such as one or more DRAM modules), and non-volatile (or non-transitory) memory 510 (e.g. one or more hard disk or solid state drives). Such memory devices may also be referred to as computer readable storage media.

System 500 also includes one or more interfaces, indicated generally by 512, via which system 500 interfaces with various devices and/or networks. Generally speaking, other devices may be integral with system 500, or may be separate. Where a device is separate from system 500, connection between the device and system 500 may be via wired or wireless hardware and communication protocols, and may be a direct or an indirect (e.g. networked) connection.

Wired connection with other devices/networks may be by any appropriate standard or proprietary hardware and connectivity protocols, for example Universal Serial Bus (USB), eSATA, Thunderbolt, Ethernet, HDMI, and/or any other wired connection hardware/connectivity protocol.

Wireless connection with other devices/networks may similarly be by any appropriate standard or proprietary hardware and communications protocols, for example infrared, BlueTooth, WiFi; near field communications (NFC); Global System for Mobile Communications (GSM), Enhanced Data GSM Environment (EDGE), long term evolution (LTE), code division multiple access (CDMA—and/or variants thereof), and/or any other wireless hardware/connectivity protocol.

Generally speaking, and depending on the particular system in question, devices to which system 500 connects—whether by wired or wireless means—include one or more input/output devices (indicated generally by input/output device interface 514). Input devices are used to input data into system 100 for processing by the processing unit 502, which may include one or more computer processors otherwise referred to as a "processor." The element processing unit 502 may generally be referred to as a processor even if it comprises multiple integrated circuits and/or other physical processing circuits or processing components. The processing unit 502 (processor) may also be implemented as a distributed computing service that is hosted by multiple servers or other computing devices. Output devices allow data to be output by system 500. Example input/output devices are described below, however it will be appreciated that not all computer processing systems will include all mentioned devices, and that additional and alternative devices to those mentioned may well be used.

For example, system 500 may include or connect to one or more input devices by which information/data is input into (received by) system 500. Such input devices may include keyboards, mice, trackpads (and/or other touch/contact sensing devices, including touch screen displays), microphones, accelerometers, proximity sensors, GPS devices, touch sensors, and/or other input devices. System 500 may also include or connect to one or more output devices controlled by system 500 to output information. Such output devices may include devices such as displays (e.g. cathode ray tube displays, liquid crystal displays, light emitting diode displays, plasma displays, touch screen displays), speakers, vibration modules, light emitting diodes/other lights, and other output devices. System 500 may also include or connect to devices which may act as both input and output devices, for example memory devices/computer readable media (e.g. hard drives, solid state drives, disk drives, compact flash cards, SD cards, and other memory/computer readable media devices) which system 500 can read data from and/or write data to, and touch screen displays which can both display (output) data and receive touch signals (input).

System 500 also includes one or more communications interfaces 516 for communication with a network, such as the Internet in environment 100. Via a communications interface 516 system 500 can communicate data to and receive data from networked devices, which may themselves be other computer processing systems.

System 500 stores or has access to computer applications (also referred to as software or programs)—i.e. computer readable instructions and data which, when executed by the processing unit 502, configure system 500 to receive, process, and output data. Instructions and data can be stored on non-transitory computer readable medium accessible to system 500. For example, instructions and data may be stored on non-transitory memory 510. Instructions and data may be transmitted to/received by system 500 via a data signal in a transmission channel enabled (for example) by a wired or wireless network connection over interface such as 512.

Applications accessible to system 500 will typically include an operating system application such as Microsoft Windows®, Apple OSX, Apple IOS, Android, Unix, or Linux.

In some cases part or all of a given computer-implemented method will be performed by system 500 itself, while in other cases processing may be performed by other devices in data communication with system 500.

The flowcharts illustrated in the figures and described above define operations in particular orders to explain various features. In some cases the operations described and illustrated may be able to be performed in a different order to that shown/described, one or more operations may be combined into a single operation, a single operation may be divided into multiple separate operations, and/or the function(s) achieved by one or more of the described/illustrated operations may be achieved by one or more alternative operations. Still further, the functionality/processing of a given flowchart operation could potentially be performed by different systems or applications.

Unless otherwise stated, the terms "include" and "comprise" (and variations thereof such as "including", "includes", "comprising", "comprises", "comprised" and the like) are used inclusively and do not exclude further features, components, integers, steps, or elements.

Although the present disclosure uses terms "first," "second," etc. to describe various elements, these terms are used only to distinguish elements from one another and not in an ordinal sense.

It will be understood that the embodiments disclosed and defined in this specification extend to alternative combinations of two or more of the individual features mentioned in or evident from the text or drawings. All of these different combinations constitute alternative embodiments of the present disclosure.

The present specification describes various embodiments with reference to numerous specific details that may vary from implementation to implementation. No limitation, element, property, feature, advantage or attribute that is not expressly recited in a claim should be considered as a required or essential feature. Accordingly, the specification and drawings are to be regarded in an illustrative rather than a restrictive sense.

The invention claimed is:

1. A computer implemented method for processing components managed by a first repository and used by a product of a second repository, the method comprising:

executing an integrator service that is communicatively coupled to the first repository and to the second repository, the first repository including a first set of source code hosted on a public network by a content delivery network (CDN), the second repository including a second set of source code hosted on an internal network, the second set of source code directed to software components different than the first set of source code;

retrieving, by the integrator service, a continuous integration plan for the second repository, the continuous integration plan indicating one or more branches of the second repository;

extracting, by the integrator service, a respective latest successful build number for each of the one or more branches of the second repository;

detecting, by the integrator service, a modification to a particular component of the first set of source code stored by the first repository, the particular component built and tested by a first service operating the first repository, and the modification comprising creation of a new branch in the first repository, wherein the new branch created in the first repository encapsulates new or modified functionality of one or more of the first repository's components that are used in a branch of the second repository associated with at least one of the respective latest successful build numbers;

downloading, by the integrator service, the detected modification from the first repository and communicating the modification to the second repository;

causing generation of an integrated repository of integrated source code, by the integrator service, through integration of the detected modification into the second repository by causing a creation of a new branch in the second repository that corresponds to the new branch in the first repository, the new branch of the second repository named to indicate the integrator service;

the integrator service triggering processing of the integrated repository;

in response to a failed integration of the integrated repository, communicating, by the integrator service, a stop status to the CDN, the stop status corresponding to the new branch in the second repository;

in response to a failed test of the integrated repository, communicating, by the integrator service, the stop status to the CDN; and in response to a successful integration and test of the integrated repository, causing generation of an artifact of the successful integration and publishing the modification to the particular component of the first set of source code on the CDN.

2. The computer implemented method according to claim 1, wherein the new branch created in the first repository has a deployment pipeline independent of a deployment pipeline of a main branch of the first repository.

3. The computer implemented method according to claim 1, wherein the processing of the integrated repository triggered by the integrator service comprises building a product from the integrated repository.

4. The computer implemented method according to claim 3, wherein the processing of the integrated repository triggered by the integrator service comprises testing the product built from the integrated repository.

5. The computer implemented method according to claim 1, wherein the integrator service detects the modification to the first repository by polling a registry to which a package built from the first repository has been uploaded.

6. The computer implemented method according to claim 5, wherein the integrator service retrieves commit information from the registry and causes the generation of the integrated repository by integration of the detected modification into the second repository by reference to the commit information.

7. The computer implemented method according to claim 1, further comprising the integrator service communicating to the first repository, modification-processing status information resulting from processing the integrated repository.

8. The computer implemented method according to claim 7, wherein the integrator service obtains the modification-processing status information by processing integrated repository information resulting from processing the integrated repository, to extract processing-status data pertaining to the detected modification.

9. The computer implemented method according to claim 7, wherein the integrator service communicates modification-processing status information to the first repository without impacting operation of the first repository.

10. A computer system comprising:
   a processing unit; and
   non-transitory memory, the non-transitory memory comprising instructions, which when executed by the processing unit cause the computer system to:
   process components managed by a first repository and used by a product of a second repository;
   execute an integrator service that is communicatively coupled to the first repository and to the second repository, the first repository including a first set of source code hosted on a public network by a content delivery network (CDN), the second repository including a second set of source code hosted on an internal network, the second set of source code directed to software components different than the first set of source code;
   cause the integrator service to retrieve a continuous integration plan for the second repository, the continuous integration plan indicating one or more branches of the second repository;
   cause the integrator service to extract a respective latest successful build number for each of the one or more branches of the second repository;
   cause the integrator service to detect a modification to a particular component stored by the first repository, the particular component built and tested by a first service operating the first repository, and the modification comprising creation of a new branch in the first repository, wherein the new branch created in the first repository encapsulates new or modified functionality of one or more of the first repository's components that are used in a branch of the second repository associated with at least one of the respective latest successful build numbers;
   cause the integrator service to download the detected modification from the first repository and communicating the modification to the second repository;
   cause the integrator service to cause generation of an integrated repository of integrated source code by integration of the detected modification into the second repository by causing a creation of a new branch in the second repository that corresponds to the new branch in the first repository, the new branch of the second repository named to indicate the integrator service;
   cause the integrator service to trigger processing of the integrated repository;
   in response to a failed build of the integrated repository, cause the integrator service to communicate a stop status of the CDN, the stop status corresponding to the new branch in the second repository;
   in response to a failed test of the integrated repository, cause the integrator service to communicate the stop status of the CDN; and
   in response to a successful integration and test of the integrated repository, cause the integrator service to cause generation of an artifact of the successful integration and publishing the modification to the particular component of the first set of source code on the CDN.

11. The computer system according to claim 10, wherein the new branch created in the first repository has a deployment pipeline independent of a deployment pipeline of a main branch of the first repository.

12. The computer system according to claim 10, wherein the processing of the integrated repository triggered by the integrator service comprises building a product from the integrated repository.

13. The computer system according to claim 12, wherein the processing of the integrated repository triggered by the integrator service comprises testing the product built from the integrated repository.

14. The computer system according to according to claim 10, wherein the non-transitory memory further comprises instructions, which when executed by the processing unit cause the computer system to cause the integrator service to detect the modification to the first repository by polling a registry to which a package built from the first repository has been uploaded.

15. The computer system according to claim 14, wherein the non-transitory memory further comprises instructions, which when executed by the processing unit cause the computer system to cause the integrator service to retrieve commit information from the registry and cause the generation of the integrated repository by integration of the detected modification into the second repository by reference to the commit information.

16. The computer system according to claim 10, wherein the non-transitory memory further comprises instructions, which when executed by the processing unit cause the computer system to cause the integrator service to communicate to the first repository, modification-processing status information resulting from processing the integrated repository.

17. The computer system according to claim 16, wherein the non-transitory memory further comprises instructions, which when executed by the processing unit cause the computer system to cause the integrator service to obtain the modification-processing status information by processing integrated repository information resulting from processing the integrated repository, to extract processing-status data pertaining to the detected modification.

18. The computer system according to claim 17, wherein the non-transitory memory further comprises instructions, which when executed by the processing unit cause the computer system to cause the integrator service to communicate modification-processing status information to the first repository without impacting operation of the first repository.

* * * * *